US005497689A

United States Patent [19]

Hoshino

[11] Patent Number: 5,497,689

[45] Date of Patent: Mar. 12, 1996

[54] FOLDABLE GUITAR STAND, PARTICULARLY FOR HOLDING THE NECK AND BODY OF AN ACOUSTIC GUITAR

[75] Inventor: Yoshiki Hoshino, Aichi, Japan

[73] Assignee: Hoshino Gakki Co., Ltd., Japan

[21] Appl. No.: 346,780

[22] Filed: Nov. 30, 1994

[30] Foreign Application Priority Data

May 6, 1994 [JP] Japan .............................. 6-006110 U

[51] Int. Cl.[6] .............................. G10B 3/00; F16M 11/38

[52] U.S. Cl. .............................. 84/327; 248/167; 248/434

[58] Field of Search .................... 84/327, 453; 248/166, 248/435, 434, 168, 170, 167

[56] References Cited

U.S. PATENT DOCUMENTS 4,943,021 7/1990 Cien et al. ................................ 84/327

*Primary Examiner*—Cassandra C. Spyrou

*Attorney, Agent, or Firm*—Ostrolenk, Faber, Gerb & Soffen

[57] ABSTRACT

A foldable guitar stand having a generally U-shaped body with the U opening toward the front side of the stand. A pair of front legs respectively attached to the left and right front sides of the stand and rotatable left and right at their journaled attachment to the front of the body. Left and right rear legs attached to the left and right ends toward the rear side of the body and journaled to swing forward and rearward. Right and left support members attached at the rear of the body and swingable upward to support the rear of the guitar stand. Buffers may be placed on the supporting surfaces of the stand.

13 Claims, 5 Drawing Sheets

FIG. 3
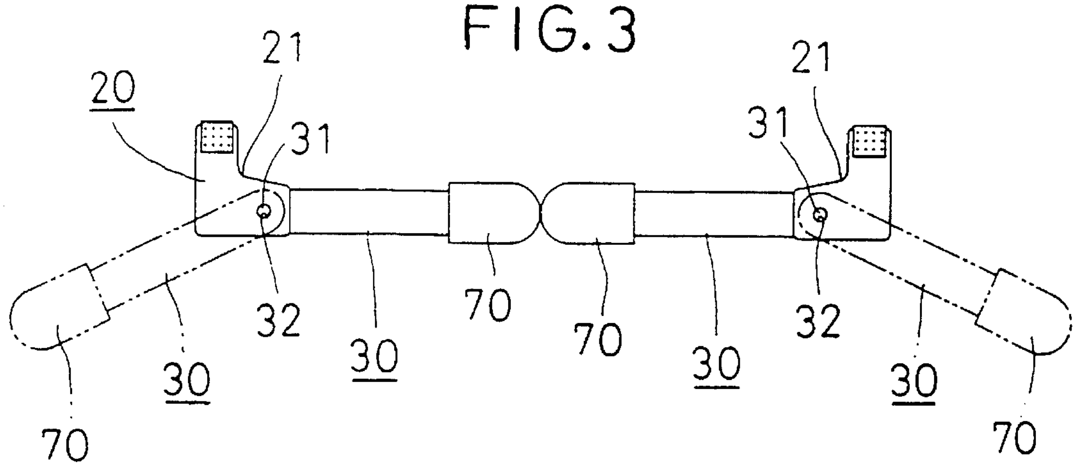
FIG. 4
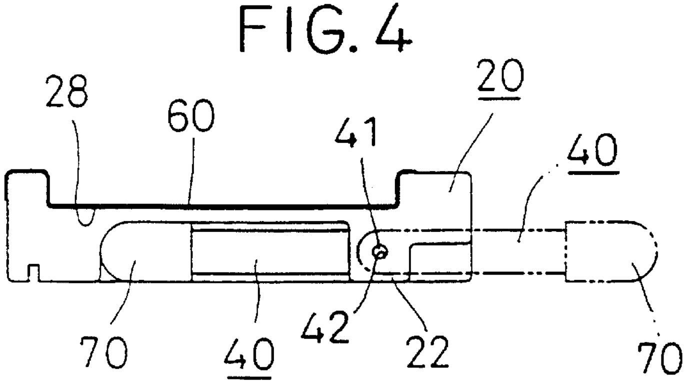
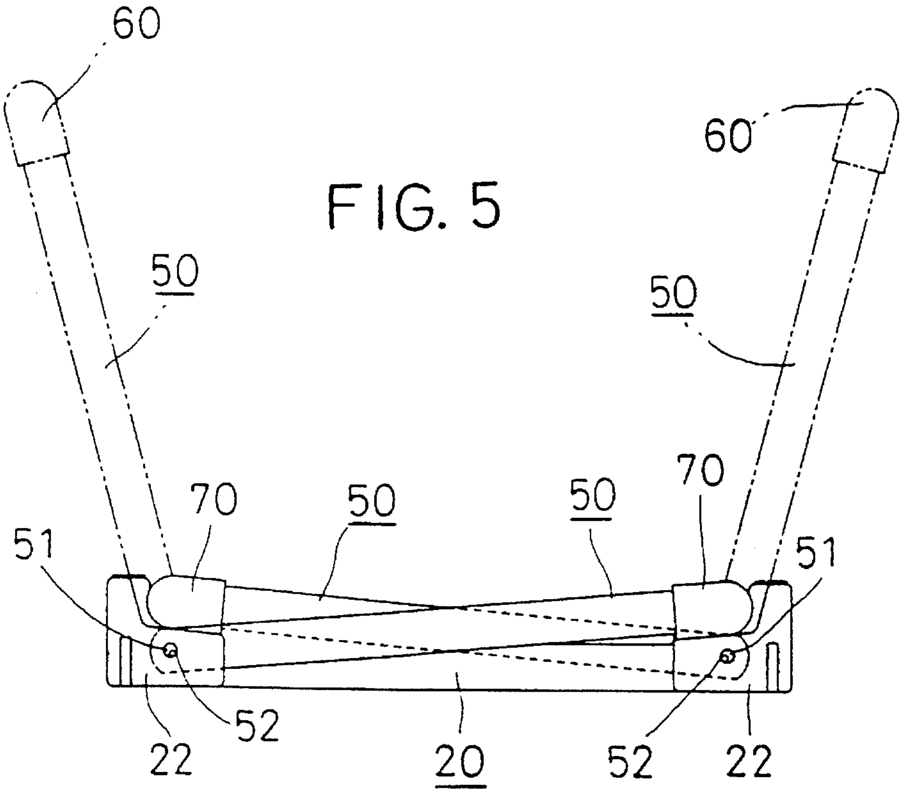
FIG. 5

FOLDABLE GUITAR STAND, PARTICULARLY FOR HOLDING THE NECK AND BODY OF AN ACOUSTIC GUITAR

BACKGROUND OF THE INVENTION

This invention relates to a foldable guitar stand, which is particularly suitable for use with an acoustic guitar.

Since a guitar has no independent support, it is often rested against its own stand. For an acoustic guitar, however, the center of gravity is located on the upper neck side, as compared with an electric guitar. As a result, an acoustic guitar is relatively unstable and it may tend to fall over when a stand for an electric guitar is used for the acoustic guitar.

Accordingly, a stand which is adapted to hold the neck and body of the guitar is ordinarily used as the stand for an acoustic guitar. However, a stand which has been made to hold both the neck and body as described above is difficult to transport as it cannot be folded.

SUMMARY OF THE INVENTION

The object of the invention is to solve the above noted problems.

Another object is to provide a foldable stand which is highly stable when the guitar is rested against the stand and which stand is also convenient to transport.

The foldable guitar stand includes a main stand body. It has right and left front legs with top ends that are fixed to the right and left front ends of the main stand body and that are fixed there in a freely rotatable or swingable manner to swing to the right and to the left. There are right and left rear legs which have tops that are fixed at the right and left ends at the rear of the main stand body and are fixed there to be freely rotatable or swingable to the front and to the rear. There are right and left support members for the rear of the guitar. Those support members include lower parts which are fixed to the right and left ends at the rear of the main stand body and are freely rotatable upward and to the right and to the left. The right and left front legs, the right and left rear legs and the right and left support members for the guitar back are all capable of being folded toward and away from the stand body.

Other objects and features of the guitar stand are explained below with reference to the attached drawings.

BRIEF DESCRIPTION OF THE DRAWINGS

FIG. 3 is a front view also showing the right and left legs at the front in action;

FIG. 4 is a right side view showing the state of the right and left legs at the rear in action;

FIG. 5 is a rear view showing the right and left support members for the guitar back in action;

DESCRIPTION OF A PREFERRED EMBODIMENT

Figure 1:
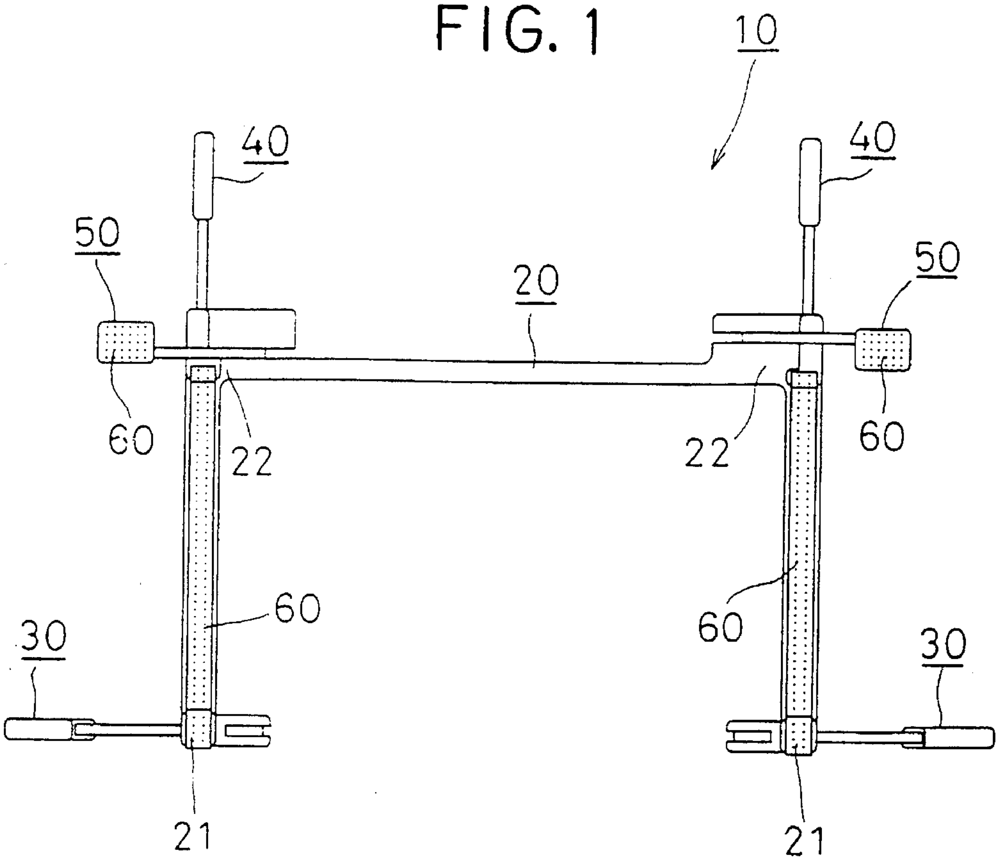
FIG. 1 is a plan view of a guitar stand according to the invention.
Figure 2:
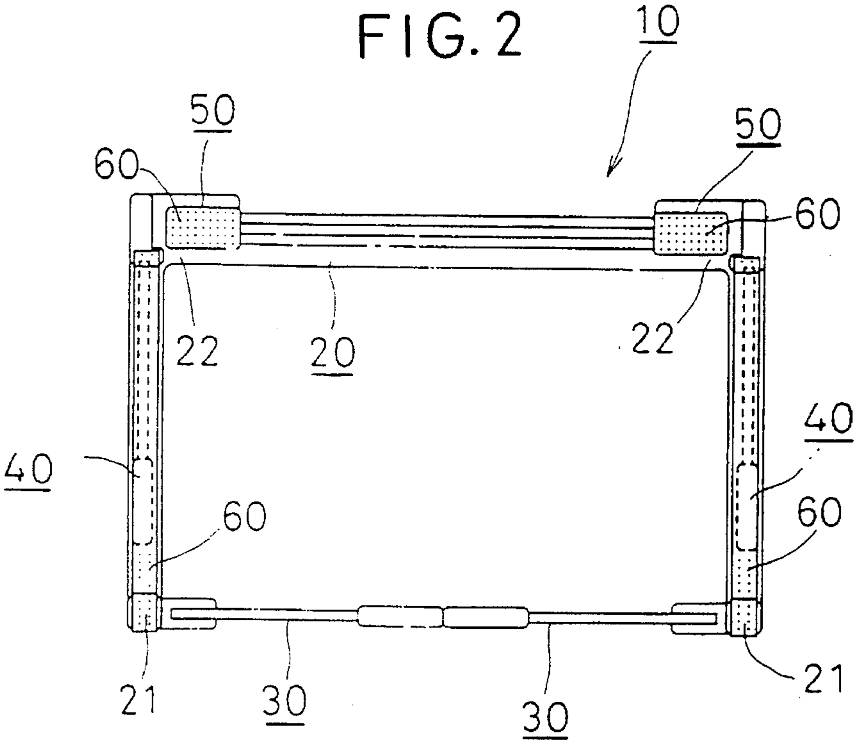
FIG. 2 is a plan view showing its folded state.

In FIGS. 1 and 2, the guitar stand 10 according to the invention comprises a main guitar stand body 20, having right and left legs 30 at the front which are capable of being folded at various parts of the main stand body 20, right and left legs 40 at the rear and the right and left support members 50 for the guitar back.

The body 20 maintains the guitar G on its upper surface. Because of this, the shape and size of the body are restricted to some extent by the shape of the guitar that is to be held. It is desirable, however, that the stand be constructed as light in weight as possible and as small as possible within the range of not compromising its ability to hold the guitar and in consideration of the characteristics of the stand for being portable.

In this example, the body 20 comprises a frame which is approximately in the shape of U, with an opening at its front. The body is made as light in weight as possible, while adequate strength is maintained. Moreover, its size is sufficient to hold the lower part of the ordinary acoustic guitar, particularly when it is held leaning, namely 250 millimeters in horizontal width and 180 millimeters in depth, and its size is compact. The thickness of the main stand body 20 is also reduced without reducing its strength. The thickness is set at 40 millimeters in this example.

Moreover, the support for the guitar is improved by providing a concave region 28 for holding the guitar on the upper surface of the body 20, as is shown in FIG. 4. A buffer 60 of rubber or sponge is provided on the upper surface of the concave region for protecting the guitar.

The right and left legs 30 located at the front have top ends which are journaled at the right and left ends 21 at the front of the body 20. The right and left legs 30 are journaled at axis 31 at the front, through an axial hole 32. The legs 30 are freely rotatable or swingable around their journals to the right and to the left, as shown in FIG. 3.

Figure 7:
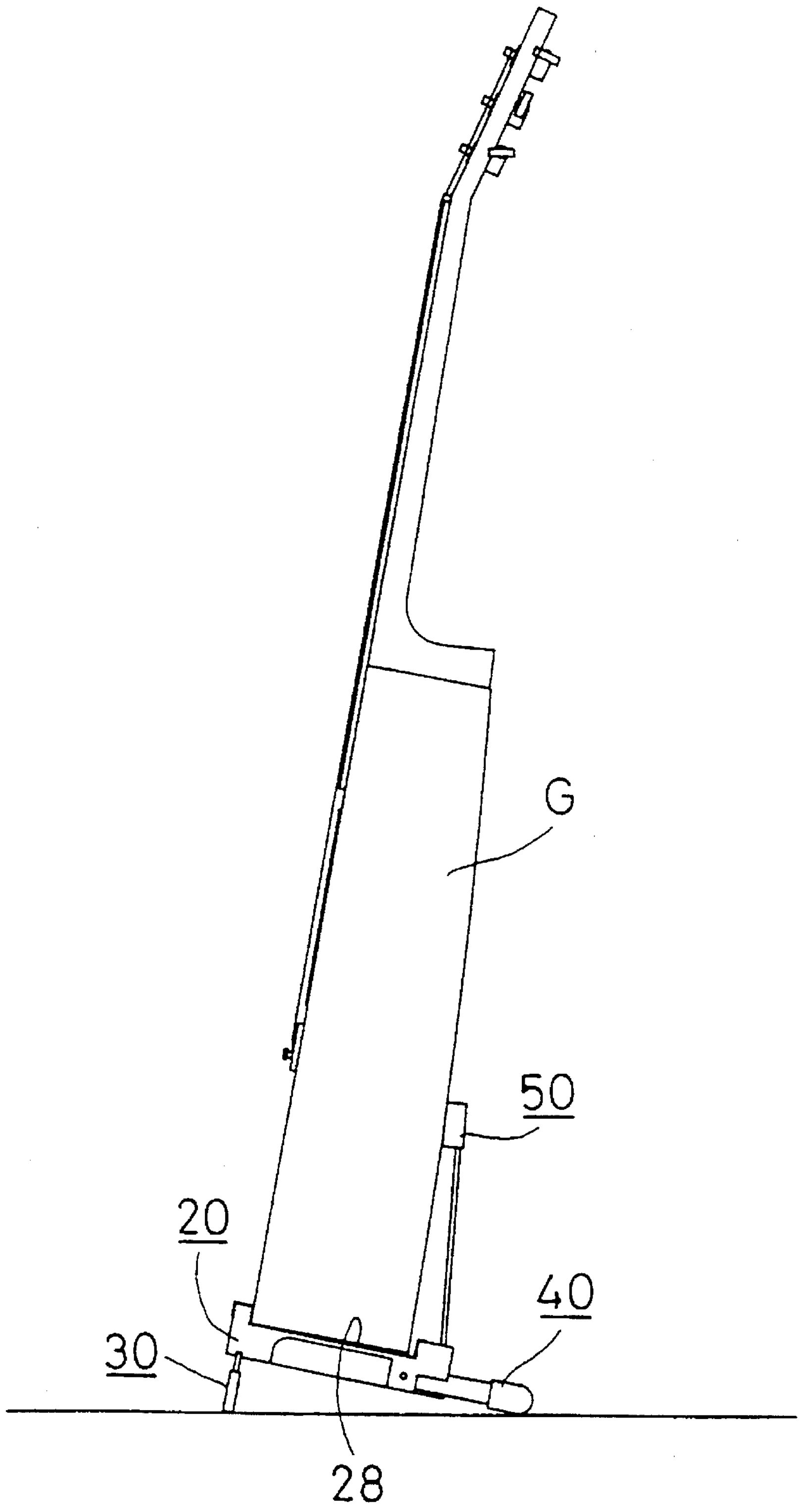
FIG. 7 is a right side view of the stand.

The right and left legs 30 at the front are opened to the right and left during use for increasing the width of the stand as a whole, as compared with the guitar support surface, and this improves the stability in the horizontal direction. The legs are not opened apart completely to be 180 degrees to each other but are instead opened to a prescribed angle to form generally the shape of a V. This raises the front part of the main stand body 20, as shown in FIG. 7, and tilts the guitar G to the rear on the main stand body 20 so that the stand is supported by the right and left support members 50 for the guitar rear as described below.

Moreover, the right and left legs 30 at the front can be folded toward each other at the front of the body 20, as shown in FIG. 2. The right and left front legs 30 are journaled at an axis 31 through an axial hole 32. There is also a leg cover 70 made of sponge or rubber, etc.

The right and left rear legs 40 are journaled at their tops at the right and left ends 22 at the rear of the main stand member 20. The legs 40 are also freely rotatable or swingable to the front and to the rear as is shown in FIG. 4. The right and left rear legs 40 open out to the rear at their time of its use. As shown in FIG. 7, this increases the front to rear width of the stand, as compared with the guitar support surface and improves its stability in the front and rear direction.

In addition, the right and left rear legs 40 are foldable toward the right and left sides, respectively, of the body 20, e.g. when the stand 10 is to be transported. The right and left legs 40 are journaled on the main stand member 20 at an axis 41 through an axial hole 42. There is a leg cover 70 at the top of each leg 40.

Furthermore, the length and the angle of opening of the right and left front legs 30 and the right and left rear legs 40 are desirably such that, when the body 20 is tilted by opening of the legs, the center of the gravity of the guitar is generally at the center of the main stand body 20.

The right and left upstanding support members 50 for the rear of the guitar are journaled, at their respective bottoms, on the right and left ends at the rear of the main stand body 20 so as to freely rotate or swing to the right and to the left and the top of the body 20.

Figure 8:
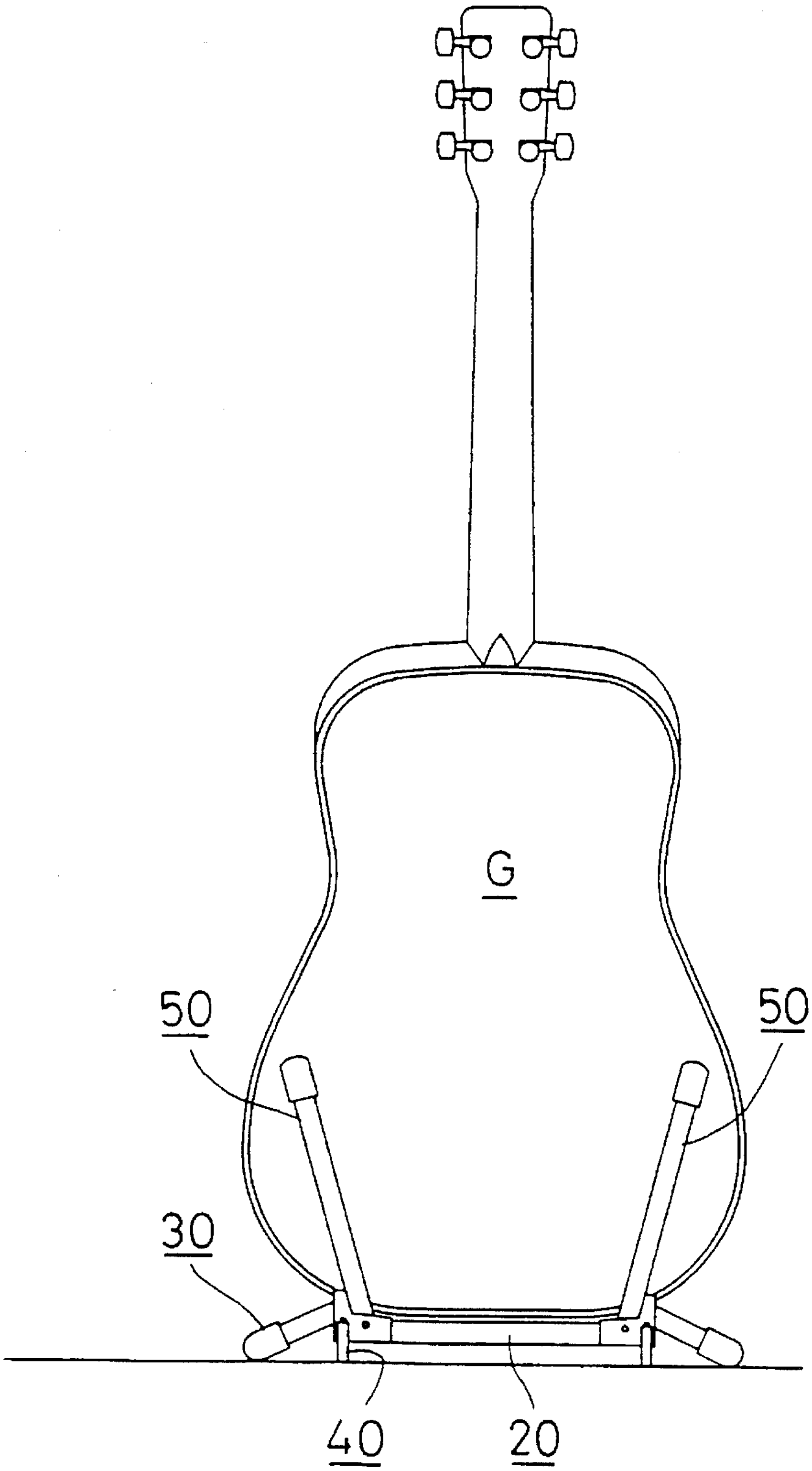
FIG. 8 is a rear view of the stand.

The right and left support member 50 for the guitar back are opened upward during use to support the rear of the guitar G as is shown in FIGS. 7 and 8. It is also desirable to provide a buffer layer 60 made of either rubber or sponge, etc. on the upper front sides of the guitar rear support 50 that contact the guitar.

The right and left support members 50 for the guitar back are folded to the rear of the main stand body 20 when the stand 10 is carried around. The right and left support members 50 are journaled at the respective axis 51 at the respective axial hole 52.

The foldable guitar stand 10 constructed in this manner can be used in the following manner.

Figure 6:
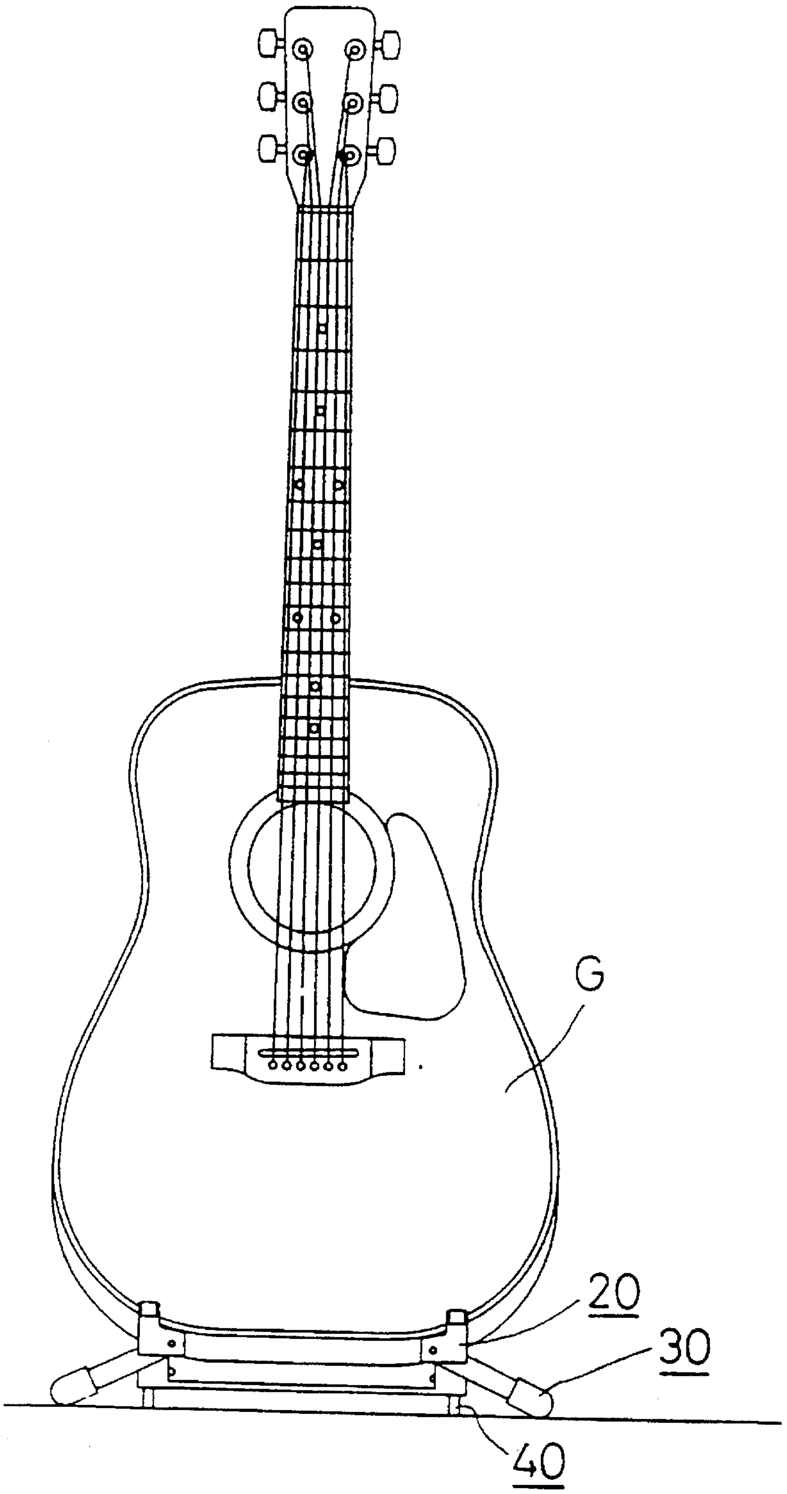
FIG. 6 is a front view showing the guitar stand in use.

As is shown in FIG. 1, the right and left front legs 30, the right and left rear legs 40 of the guitar stand 10 and the right and left support members 50 for the guitar rear are opened to assume their positions shown in FIGS. 6 through 8. In addition, the lower part of the guitar G is placed on the main stand body 20. Since the main stand holding body 20 is such that its front becomes higher, the top of the guitar G tilts to the rear and its rear is supported by the right and left support members of the guitar rear 50. At this time, the right and left front legs 30 extend to the sides of the main stand body 20 for assuring stability in the horizontal direction and the right and left rear legs 40 extend to the rear for assuring stability in the front to rear direction. Thus, an extremely high level of stability is assured, despite the size of the main stand member 20.

Following use of the guitar stand 10, the right and left front legs 30, the right and left rear legs 40, and the right and left support members 50 for the guitar rear are folded respectively to the front, to the right and left sides and to the rear of the main stand body 20. This reduces the size of the guitar stand 10 approximately to the size of the main stand body 20, thereby making it easier for the stand to be transported or stored. The size of the guitar stand 10 when the various parts are folded and stored is the same as the outer shape of the main stand body 20, so that it is highly compact with a horizontal width of 250 millimeters, a front to the back width of 180 millimeters and a thickness of 40 millimeters.

Although the right and left front legs and the right and left rear legs are disclosed as being foldable, either of the front or the rear legs may be fixed to the main stand body in an opened state for further simplifying the structure of the foldable guitar stand. In that case, portability is sacrificed to some extent as compared with the previous example. Because the right and left support members for the guitar back are foldable, however, it will be sufficiently easy to carry the stand around.

The foldable guitar stand of this invention is highly stable when the guitar is leaned against the stand, and the stand is also highly convenient to carry around. Because of its high stability, moreover, the stand is capable of firmly holding an acoustic guitar in which the center of gravity lies comparatively quite high.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A foldable guitar stand comprising:

a main stand body having a front side and an opposite rear side, and having opposite right and left ends;

a right front leg having a first top part which is fixed at the front side toward the right end of the body in a manner permitting rotation and swinging of the right front leg toward the left and the right ends;

a left front leg having a second top part which is fixed at the front side toward the left end of the body in a manner permitting rotation and swinging of the left front leg toward the left and the right ends;

a right rear leg having a third top part which is fixed at the right end toward the rear side of the body in a manner permitting rotation and swinging of the right rear leg in the directions toward the front and the rear sides;

a left rear leg having a fourth top part which is fixed at the left end toward the rear side of the body in a manner permitting rotation and swinging of the left rear leg toward the front and the rear sides;

a right support member for supporting a rear side of a guitar and being located at the rear side of the body, the right support member having a lower part which is fixed to the rear side of the body toward the right end in a manner which permits the right support member to be rotatable toward the left end and toward the right end around a location at which the right support member is fixed to the body, in order for the right support member to be rotatable upward to a guitar supporting position;

a left support member for supporting a rear of the guitar and also located at the rear side of the body, the left support member having a lower part which is fixed to the rear of the body toward the left end in a manner which permits the left support member to be rotatable toward the left end and toward the right end around a location at which the left support member is fixed to the body, in order for the left support member to be rotatable upward to the guitar supporting position.

2. The guitar stand of claim 1, wherein the main stand of the body comprises a generally U shaped frame having an opening toward the front side of the body.

3. The guitar stand of claim 2, wherein the stand has an upper side, a buffer provided on the upper side of the stand for supporting a guitar on the upper side buffer.

4. The guitar stand of claim 3, wherein the support members each have a front side and when the support members are rotated upward, the support members each have a respective upper front surface side, a buffer on each said upper front surface side for supporting the guitar thereon.

5. The guitar stand of claim 2, wherein the front legs are fixed to the stand body in a manner which permits the legs to be opened approximately to a V shape, respectively inclined toward the right and the left ends.

6. The guitar stand of claim 1, wherein the support members each have a front side and when the support members are rotated upward, the support members each have a respective upper front surface side, a buffer on each said upper front surface side for supporting the guitar thereon.

7. The guitar stand of claim 1, wherein the front legs are fixed to the stand body in a manner which permits the legs to be opened approximately to a V shape, respectively inclined to the right and to the left.

8. The guitar stand of claim 7, wherein the right and the left rear legs are respectively so fixed to the right and the left ends at the rear side of the stand body that the right and left rear legs may be rotated to extend toward the rear side of the main stand body.

9. The guitar stand of claim 1, wherein the right and the left rear legs are respectively so fixed to the right and the left ends at the rear side of the stand body that the right and left rear legs may be rotated to extend toward the rear side of the main stand body.

10. The guitar stand of claim 5, wherein the right and the left rear legs are respectively so fixed to the right and the left ends at the rear side of the stand body that the right and left rear legs may be rotated to extend towards the rear side of the main stand body.

11. The guitar stand of claim 1, wherein the main stand body defines a substantially rectangular guitar-receiving area.

12. The guitar stand of claim 2, wherein the main stand body defines a substantially rectangular guitar-receiving area.

13. The guitar stand of claim 3, wherein the main stand body defines a substantially rectangular guitar-receiving area.

* * * * *